Figure 1:
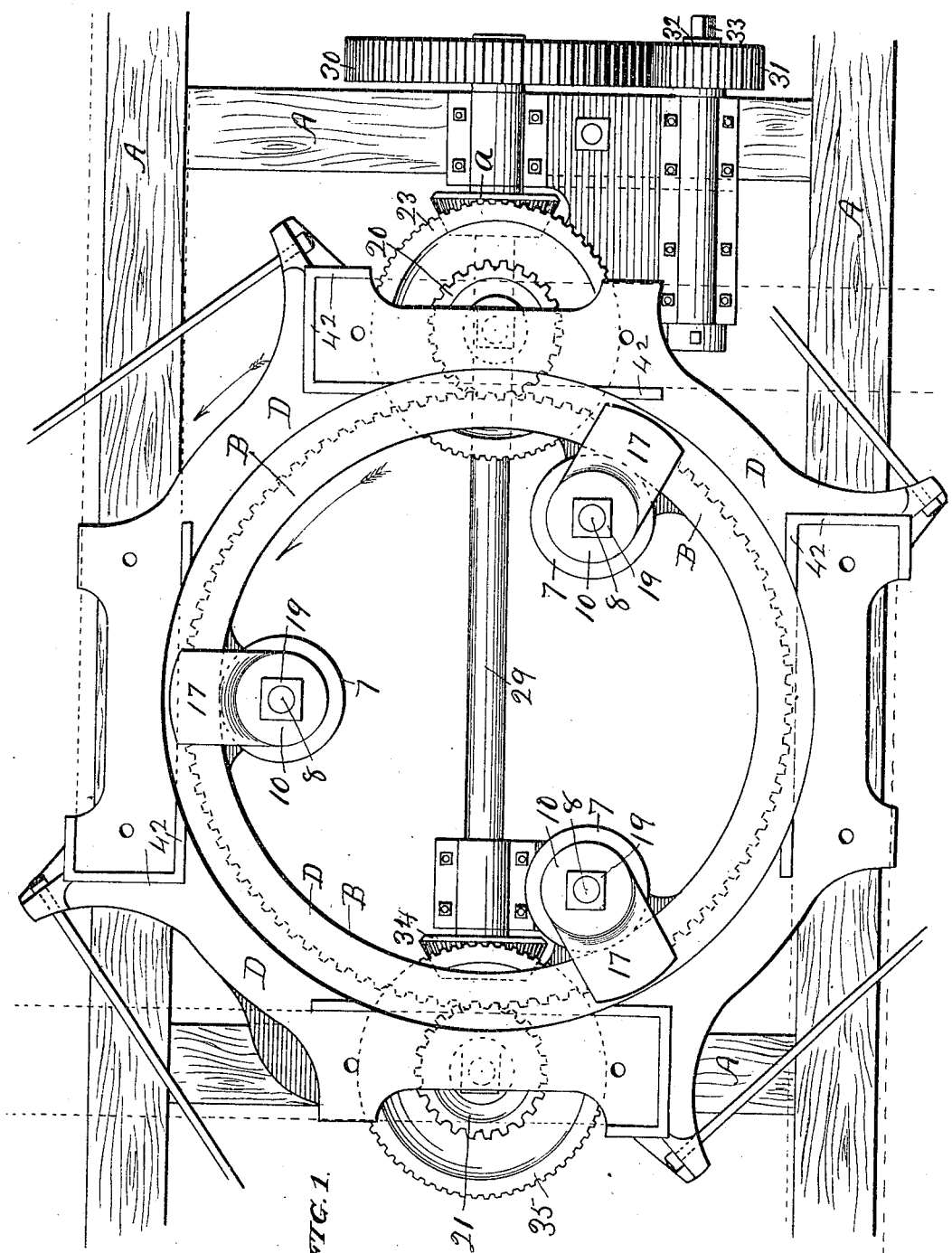

No. 812,282. PATENTED FEB. 13, 1906.
J. G. MOLE.
HORSE POWER.
APPLICATION FILED DEC. 30, 1901.

3 SHEETS—SHEET 1.

WITNESSES:
F. B. Townsend
J. P. Donaldson

INVENTOR.
J. G. Mole
BY L. B. Copeland & Co.
ATTORNEYS

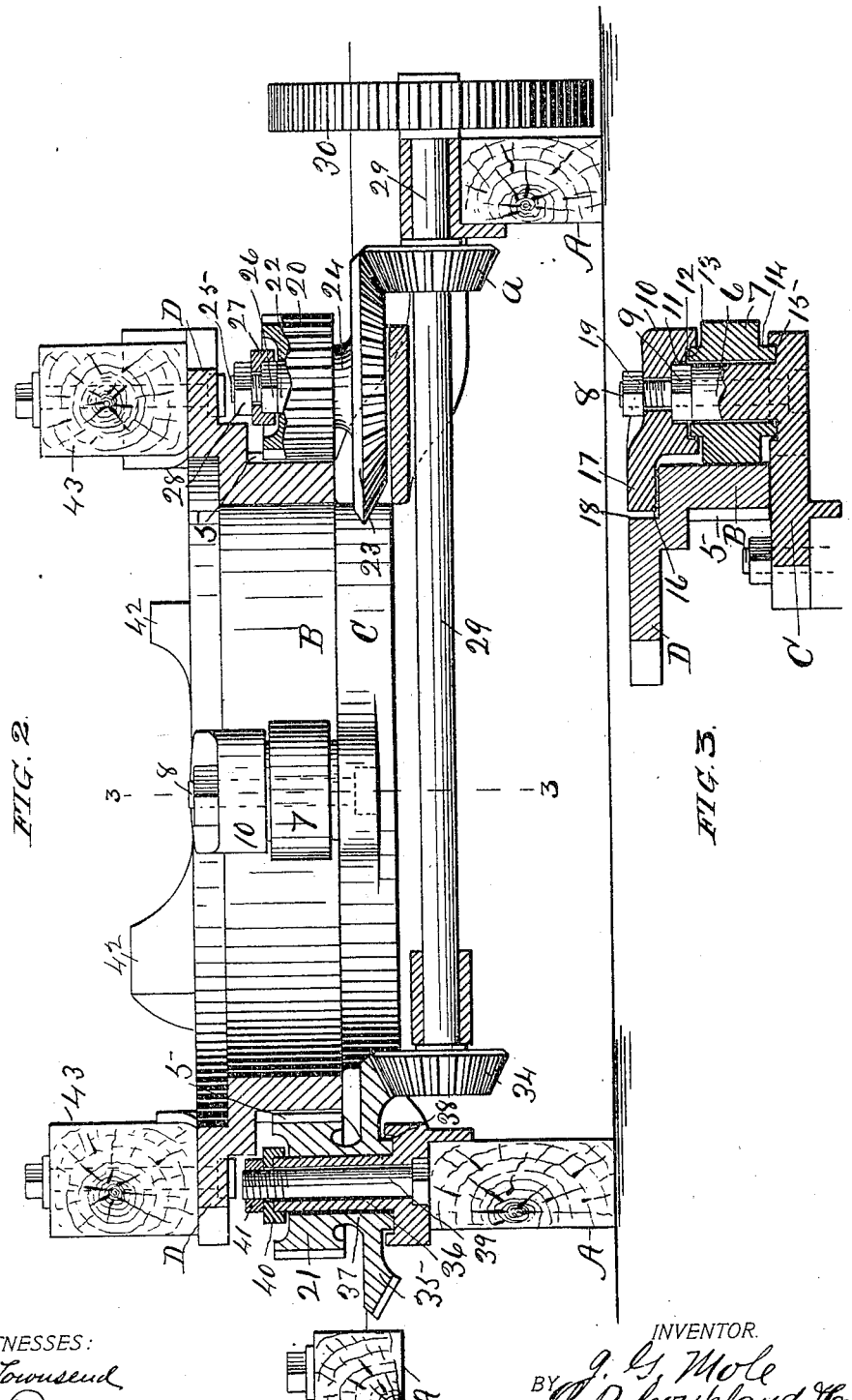

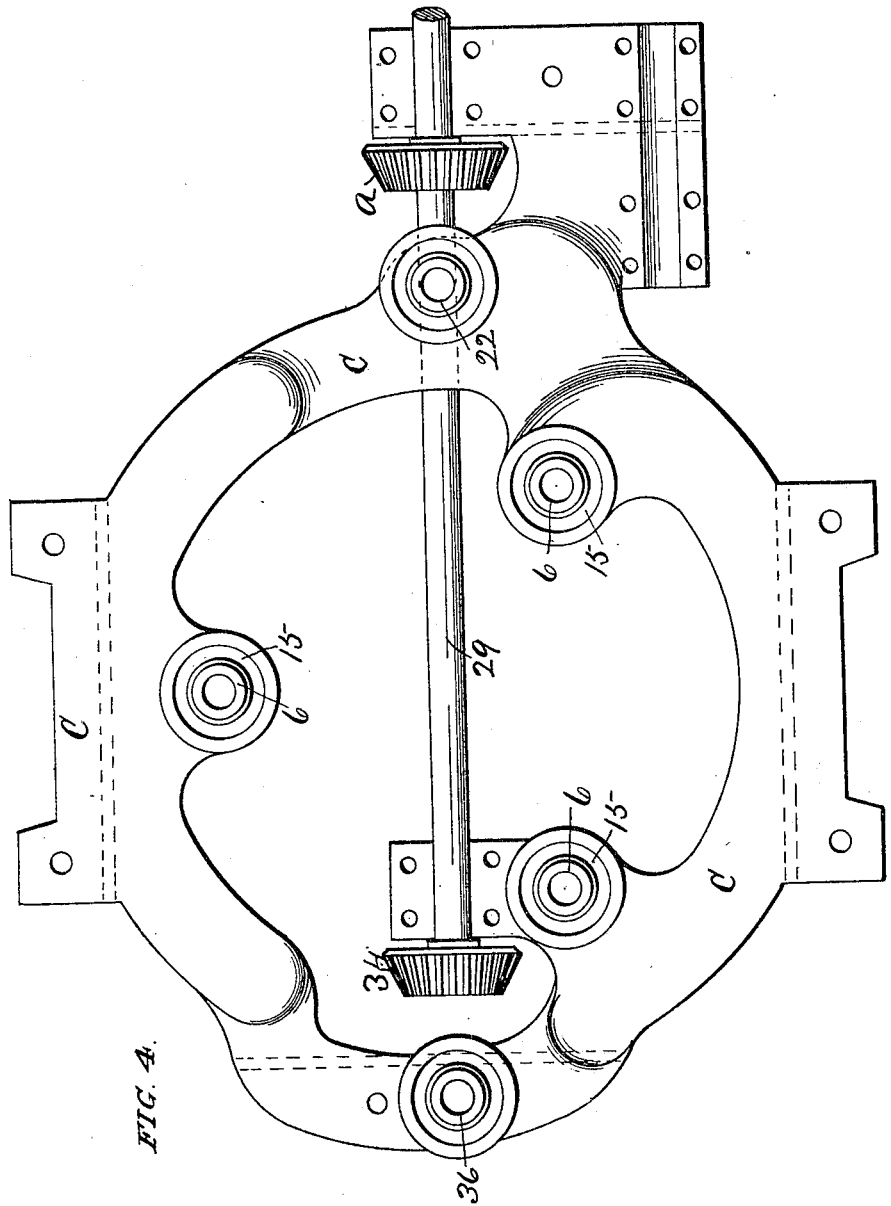

UNITED STATES PATENT OFFICE.

JOHN G. MOLE, OF BATAVIA, ILLINOIS.

HORSE-POWER.

No. 812,282.

Specification of Letters Patent.

Patented Feb. 13, 1906.

Application filed December 30, 1901. Serial No. 87,801.

*To all whom it may concern:*

Be it known that I, JOHN G. MOLE, a citizen of the United States, residing at Batavia, in the county of Kane and State of Illinois, have invented certain new and useful Improvements in Horse-Powers; and I do hereby declare the following to be a full, clear, and exact description of the invention, such as will enable others skilled in the art to which it appertains to make and use the same.

This invention relates to horse-power machines for driving other machinery, and has for its object to provide a machine of this kind from which a greater amount of power may be obtained proportionately with the weight thereof and the space occupied thereby than is possible under the ordinary arrangement.

A further object is to provide certain construction features for positively retaining the driving-gear mechanism in true alinement, and thereby lessening the liability to get out of order and also reducing the friction to a minimum.

In the drawings, Figure 1 is a plan embodying the improved features. Fig. 2 is a longitudinal section; Fig. 3, a transverse section on line 3, Fig. 2, and Fig. 4 is a plan of a bottom casting or base.

A represents the different timbers forming a supporting-frame, which will be solidly secured in a stationary position.

The main driving or master gear-wheel B is simply a ring and has no center-bearing or hub and rests on the bearing-surfaces of the stationary base C. This gear-wheel is provided with an overhanging horizontal flange D, as more clearly shown in Fig. 2. The gear-teeth are formed on the exterior surface of the wheel below the overhanging flange, as shown in Figs. 2 and 3 and indicated by dotted lines in Fig. 1. The base C is provided at intervals with vertical bearing-sleeves 6, Figs. 3 and 4, on which friction bearing-rollers 7 are loosely mounted. A bolt 8 is inserted up through these sleeves and heads in the under side of the base, as indicated by dotted lines. A lock-nut 9 is screwed down to a bearing on the upper end of the sleeve or sleeves 6 and retains the bolt or bolts 8 in their normal position. A guide bearing-plate 10 is loosely mounted on the upper ends of the bolts 8 and is provided in the under side with a recess 11, Fig. 3, in which the lock-nut 9 is seated, and thereby prevented from working loose. The plate 10 is also provided with a lower recess 12 for a loose engagement with the upper hub end 13 of the bearing-rollers 7, the lower hub ends 14 of which seat in a bearing-groove 15, formed in the upper side of the base C. The friction bearing-rollers 7 are positioned at equidistant intervals, Fig. 1, and have a bearing on the inner circumferential surface of the driving gear-wheel and reduces the friction to a minimum.

The driving gear-wheel is cut away to form an annular shoulder 16 on the inner upper edge or junction of the vertical part of the gear-wheel and its horizontal overhanging flange. The plate or plates 10 are provided with an extended end 17, which projects over the annular shoulder 16 and stops just short of the vertical wall 18 thereof. The normal position of the overlapping ends of the plates 17 is out of contact; but the adjacent surfaces are so close that the least wabbling of the gear-wheel will bring the surface in contact and the wheel steadied into its true running position. A nut 19 retains the plates 10 in place on bolts 8.

The driving gear-wheel engages pinions 20 and 21, located diametrically opposite each other on the longitudinal line of the machine. The pinion 20 is located at that end of the machine from which the power will usually be transmitted, and the driving connections therewith will be first described. The base-casting at this end of the machine is provided with a vertical bearing-sleeve 22, Fig. 4, on which a gear-wheel 23 is loosely mounted. The pinion 20 is rigidly mounted on the upper extended hub 24 of the gear-wheel 23, as shown in Fig. 2, the parts being broken away. A bolt 25 is inserted up through the sleeves 22 from the under side of the base. A lock-nut 26 is screwed down on the threaded end of the bolt 25 to a bearing and a locking-cap 27 seated down over the same to prevent its working loose, the locking-cap being secured by a nut 28, by which means the pinion and its gear-wheel are retained in their proper working position and prevented from having a vertical movement. The gear-wheel 23 in turn engages a pinion mounted on the driving-shaft 29, provided with suitable journal-bearings in the base C. A gear-wheel 30 is mounted on the outer extended end of shaft 29 and engages a pinion 31, mounted on a stub-shaft 32, journaled in the base-casting C. The stub-shaft is provided with a square end 33 for engagement with a tumbling-rod or other connection in transmitting the power to the mechanism to be driven. A pinion 34 is mounted on the opposite end of the driving-shaft and engages a gear-wheel 35, which is formed on the same hub with pinion 21 and providing a compound gear-wheel and pinion structure mounted on a bearing-sleeve 36, extending upward from the base C. The lower end of the hub part 37 has a bearing in an annular groove 38. A bolt 39 is inserted up through the sleeve 36 and has a cap 40 loosely mounted on the threaded end and which sets down over the upper end of sleeve 36. A lock-nut 41 retains the parts in place and prevents a vertical movement of the pinion and gear-wheel. The pinion a, mounted on the driving-shaft, is located on the outer side of the engaging gear-wheel 23 and the companion pinion 34 located on the inner side of the engaging gear-wheel 35. This brings the gear-wheels into the same relative position, the gear 23 being on the inner side of pinion a and the gear 35 on the outer side of pinion 34. By this disposition the two sets of motion-transmitting gearing between the driving-wheel B and the respective ends of the driving-shaft are both driven in the same direction. By this arrangement the main gear-wheel has two power-transmitting engagements with the driving-shaft, and thereby greatly increasing the leverage force without proportionately increasing the dimensions and weight of the machine, which is a great advantage.

The overhanging part of the driving gear-wheel is provided on the upper side with vertical flanges 42, inclosing an open socket-space for the reception of the inner ends of the usual sweep-levers 43, which are removably bolted in place, as shown. The rods 44 provide brace connections between the levers 43 and the lugs 45, forming an integral part of the overhanging flange of the main gear-wheel.

Having thus described my invention, what I claim, and desire to secure by Letters Patent, is—

In a horse-power, the combination with a supporting-base provided with a number of vertical bearing-sleeves, of a driving gear-wheel, the friction-rollers loosely mounted on said sleeves, a bolt inserted upward therethrough, a lock-nut threaded on said bolt, a guide bearing-plate, loosely mounted thereon and overlapping a part of said gear-wheel and recessed in the under side to engage the lock-nut and the upper hub end of said rollers, substantially as set forth.

In testimony whereof I affix my signature in presence of two witnesses.

JOHN G. MOLE.

Witnesses:
J. B. DONALSON,
L. B. COUPLAND.